(12) United States Patent
Keithley

(10) Patent No.: US 7,025,266 B2
(45) Date of Patent: Apr. 11, 2006

(54) DEVICE AND METHOD FOR DIGITIZING A SERIALIZED SCANNER OUTPUT SIGNAL

(76) Inventor: Douglas Gen Keithley, 10740 W. Skycrest St., Boise, ID (US) 83713

( * ) Notice: Subject to any disclaimer, the term of this patent is extended or adjusted under 35 U.S.C. 154(b) by 0 days.

(21) Appl. No.: 10/630,506

(22) Filed: Jul. 29, 2003

(65) Prior Publication Data

US 2005/0023350 A1 Feb. 3, 2005

(51) Int. Cl.
*G06K 7/10* (2006.01)

(52) U.S. Cl. .................... 235/454; 235/462.25

(58) Field of Classification Search ................
235/462.01–462.43, 454, 455, 470, 472.01, 235/472.02, 472.03
See application file for complete search history.

(56) References Cited

U.S. PATENT DOCUMENTS

| | | | |
|---|---|---|---|
| 5,726,779 A * | 3/1998 | Kadowaki et al. | 358/520 |
| 5,991,055 A * | 11/1999 | Haselby et al. | 358/509 |
| 2004/0008387 A1* | 1/2004 | Ikeno | 358/505 |
| 2004/0012830 A1* | 1/2004 | Yokochi | 358/474 |
| 2004/0072497 A1* | 4/2004 | Hirano et al. | 445/66 |
| 2004/0075748 A1* | 4/2004 | Rogers et al. | 348/222.1 |

OTHER PUBLICATIONS

Analog Device; Complete 14-Bit CCD/CIS Signal Processor AD9822; REV. A; Analog Devices, Inc., Norwood, MA, (1999), pp. 1-15.
Wolfson Microelectronics, WM8196, (8+8) Bit Output 16-bit CIS/CCD AFE/Digitiser; Production Date, Dec. 2002, Rev 3.0; Wolfson Microelectronics plc; (2002), pp 28.

* cited by examiner

*Primary Examiner*—Thien M. Le (57) ABSTRACT

A device for individually processing each color component of a serial analog signal from a color scanner. The device includes a multiple-channel-image-capture circuit comprising an analog front end/digitizer having a plurality of channels operable to process an analog-color signal with one channel for each color component of the analog-color signal, a register, and an analog-to-digital converter operable to output a digital signal responsive to the analog-color signal, and a controller operable to control the color component processing by the plurality of input channels such that each color component of a serial analog-color signal is individually processed. Each input channel of the analog front end/digitizer may include a programmable circuit operable to modify a color component of the color signal in response to a value stored in the register related to the color component.

24 Claims, 4 Drawing Sheets

DEVICE AND METHOD FOR DIGITIZING A SERIALIZED SCANNER OUTPUT SIGNAL

BACKGROUND

Figure 1:
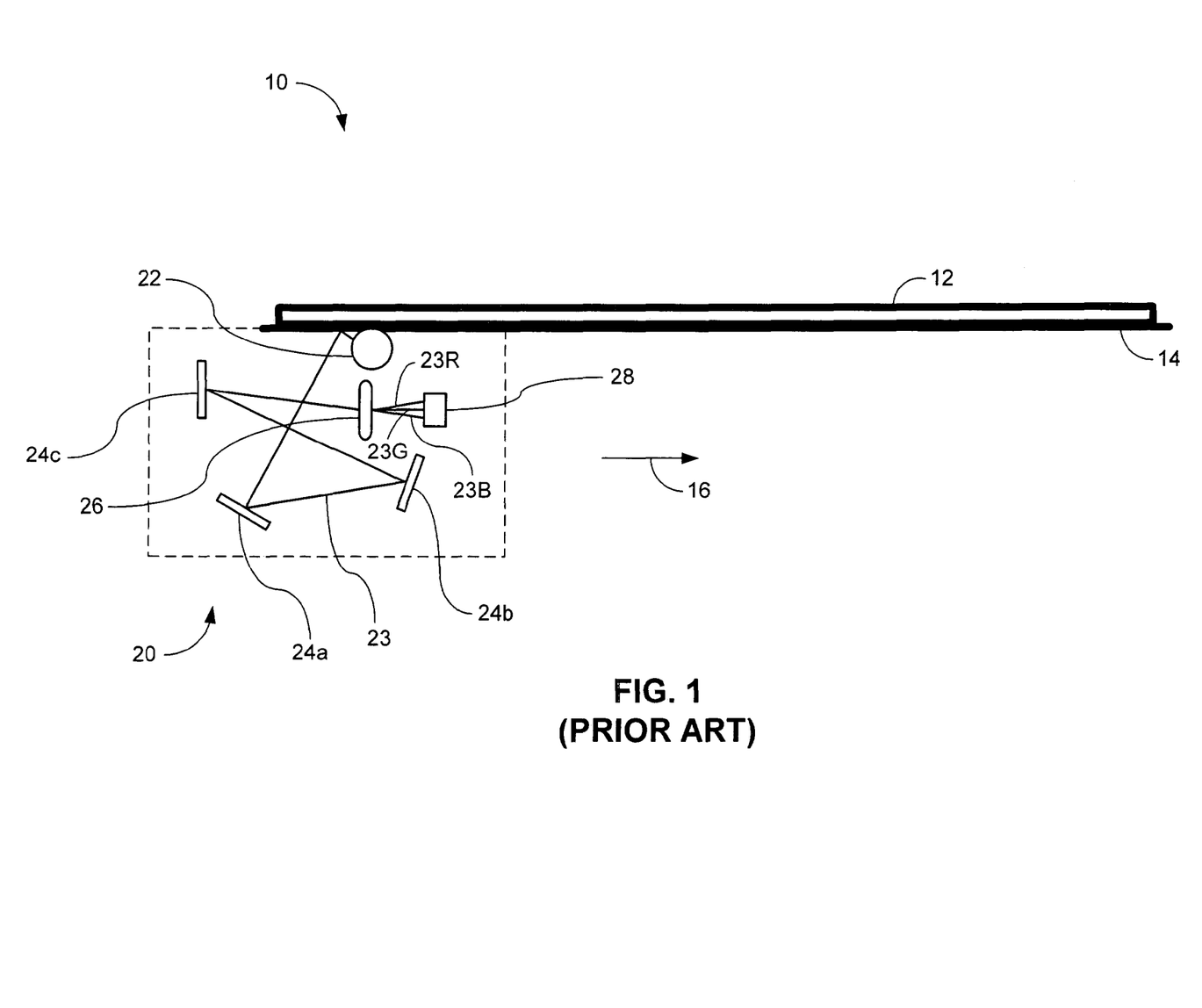
FIG. 1 illustrates certain components of a conventional scanner.

The present invention relates generally to controlling an analog-front-end/digitizer having a plurality of color-signal-processing channels. The invention further relates to controlling the analog-front-end/digitizer such that each color component of a serial-analog-color signal generated by a contact image-sensor scan head is individually processed by a respective gain/offset channel FIG. 1 illustrates certain components of a conventional scanner 10. The scanner 10 can be part of a copier or a device used for digitizing images for use with a personal computer. The scanner 10 typically includes a glass platen 14 on which a source image 12, such as a document or photograph, is placed for scanning. The scan head 20 typically includes a white light 22 for illuminating the source image 12, and is moved relative to the source image in a direction 16. The scan head 20 also includes a relatively small, i.e., perhaps one inch by one inch, charged coupled device (hereafter CCD) 28, which captures an image of the source image 12. A lens 26 and an optical path 23 reduce the size of an image of the source image 12, which may be 8½-inches wide where the source image is a standard size sheet of paper, down to a size capturable by the CCD 28. An optical path of at least one foot is usually required for this. Therefore, the scan head 20 includes a plurality of mirrors, illustrated as mirrors 24a–24c, so the path 23 does not have to be a linear foot but can be "folded down" to a shorter or compact overall dimension. The last mirror 24c reflects the image onto the lens 26, which focuses it on the CCD 28. The scan head 20, however, may have more than one lens, and more or fewer than three mirrors. Furthermore, for color images, the scan head 20 usually includes three paths 23, one for a red (23R), one for green (23G), and one for blue (23B). Portions of these paths 23R, 23G, and 23B are shown in FIG. 1.

For a color scanner 10, the CCD 28 typically has an array of three rows of sensors, one each for red (28R), green (28G), and blue (28B) (not shown). For an 8.5-inch wide, 600 dpi sensor, there are 5100 sensors in each row, for 16,300 sensors total. These arrays continuously and simultaneously capture the red, green, and blue components of the image being copied as the scan head 20 moves in direction 16 relative to the source image 12. Therefore, the CCD 28 continuously and simultaneously outputs parallel red, green, and blue analog image signals for processing into a digital representation of the source image 12.

Figure 2:
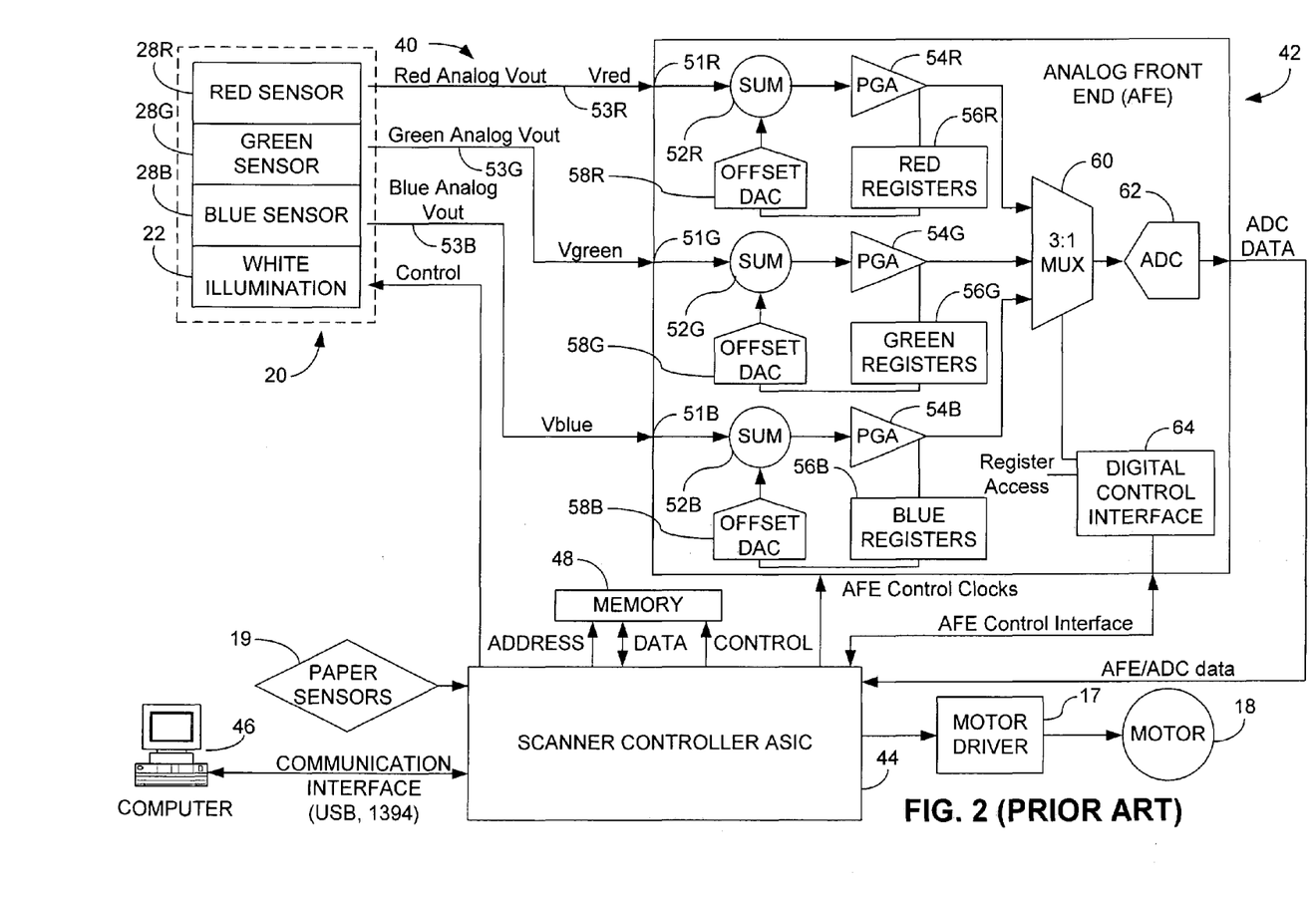
FIG. 2 is a schematic block diagram of a conventional multiple-channel image-processing system that scans images for display and use in a personal computer.

FIG. 2 is a schematic block diagram of a conventional multiple-channel image processing-system 40 that scans images for display and use in a personal computer 46. The system 40 includes the scan head 20 of the scanner 10 of FIG. 1, and further includes paper sensors 19, a motor driver 17, and a motor 18 that moves the scan head 20 relative to the source image 12 (FIG. 1) being scanned. The system 40 also illustrates an analog front end/digitizer 42 (also referred to as "AFE 42"), a scanner controller 44, and a memory 48.

FIG. 2 is a schematic block diagram of a conventional multiple-channel image processing-system 40 that scans images for display and use in a personal computer 46. the system 40 includes the scan head 20 of the scanner 10 of FIG. 1, and further includes paper sensors 19, a motor driver 17, and a motor 18 that moves the scan head 20 relative to the source image 12 (FIG. 1) being scanned. The system 40 also illustrates an analog front end/digitizer 42 (also referred to as "AFE 42"), a scanner controller 44, and a memory 48.

The AFE 42 is known in the prior art, and includes three input channels, one each for the red, green, and blue color components of the parallel-analog signal generated by the CCD 28. Each input channel includes a respective connector 51, a programmable offset DAC 58, a SUM 52, a programmable gain amplifier 54, and a register 56. While separate registers are shown for each channel, a single register common to all three channels may be used. The outputs of each channel are coupled to a 3:1 multiplexer 60, and the multiplexer 60 is coupled to an analog-to-digital converter 62. A digital-control interface module 64 is coupled to the 3:1 multiplexer 60, the register 56, and, optionally, other components of the AFE 42. The interface 64 is configured for coupling components of the AFE 42 with devices such as the controller 44.

The controller 44 is typically an application-specific integrated circuit that includes functionality to operate the scanner 10 of FIG. 1, including the scan head 20, the AFE 42, and to interface with the personal computer 46. A memory 48 provides memory services to the controller 44, and may be any type of addressable storage device.

In use, each color-component signal generated by the sensors of CCD 28 is initially calibrated to optimize the amplitude and determine the offset. The calibration includes adjusting the amplitude of each color-component signal to use the full input range of the ADC 62. This maximizes the signal to noise ratio. For example, the Blue Analog Vout from the blue sensor 28B might have only one-half the amplitude of the Red Analog Vout from the red sensor 28R. The calibration process determines what gain is necessary for each color-component signal so that all the color-component signals will have substantially the same amplitude, and will use the full number of available bits provided by the ADC 62. Values that set the amplifiers 54 to the necessary gains are stored in the respective register 56 for each color component. Likewise, the calibration process determines the offset or dark correction necessary for each color-component analog signal, and values that set the DACs 58 to the necessary offset are stored in the respective register 56 for each color component.

Once scanning begins, the red, green, and blue sensors of the CCD 28 in response to a reflection of the white light from the source image 12 produce respective continuous and simultaneous parallel analog-color signals shown as Analog Vout in FIG. 2. The parallel Analog Vout signals are coupled respectively to the AFE 42 at connectors 51R, 51G, and 51B over lines 53R, 53G, and 53B into their respective color-component channels. The AFE 42 processes the parallel analog-color signals in their respective channels by simultaneously sampling each red, green, and blue color-component signals shown as Red Analog Vout, Blue Analog Vout, and Green Analog Vout from the sensors 28R, 28B, and 28G. The DAC 58 level shifts each color-component signal by the offset value stored in the register 56. Then, the PGAs 54R, 54B, and 54G respectively scale each color-component signal by the gain value stored in the register 56. At this point, each color component of the parallel analog-color signal has been individually processed in its channel. The three processed color signals from the three programmable gain amplifiers 54R, 54G, and 54B are then multiplexed through the 3:1 multiplexer 60, which sequentially samples the three processed color signals and generates a single analog signal that is provided to the ADC 62. The ADC 62 converts the single analog signal into a digital ADC data signal. The ADC data signal presents a single pixel at a time, and sequentially presents three colors for a single pixel column but not for a single pixel. The reason that the ADC data signal does not present three colors for a single pixel is that the physical separation of the three rows of the sensors 28R, 28G, and 28B makes the colors physically separated on the page. For example, if the red scan is from row 1, the green scan will be from row 5 and the blue scan will be from row 9—all the same pixel column number. The data (COLORrow-column) from the ADC 62 looks like:

R1-1, G5-1, B9-1, R1-2, G5-2, B9-2, . . . R1-5100, G5-5100, B9-5100

R2-1, G6-1, B10-1, R2-2, G6-2, B10-2, . . . R2-5100, G6-5100, B10-5100

The ADC data signal is provided to the controller 44, which exposes the ADC data signal to the personal computer 46.

For example, red light reflected from a source image 12 (of FIG. 1) is sensed by the red senor 28R, which generates the Red Analog Vout signal. The Red Analog Vout signal is connected by line 53R to terminal 51R of the AFE 42, where it is then connected to SUM 52R. At SUM 52R, Red Analog Vout signal is level shifted or offset by the previously calibrated red offset stored in the Red Register 56R, and the offset Red Analog Vout signal is then scaled by the PGA 54R by the previously calibrated gain. The offset and scaled Red Analog Vout signal is multiplexed through the 3.1 MUX 60 along with the green and blue offset and scaled signals and digitized by the ADC 62.

Figure 3:
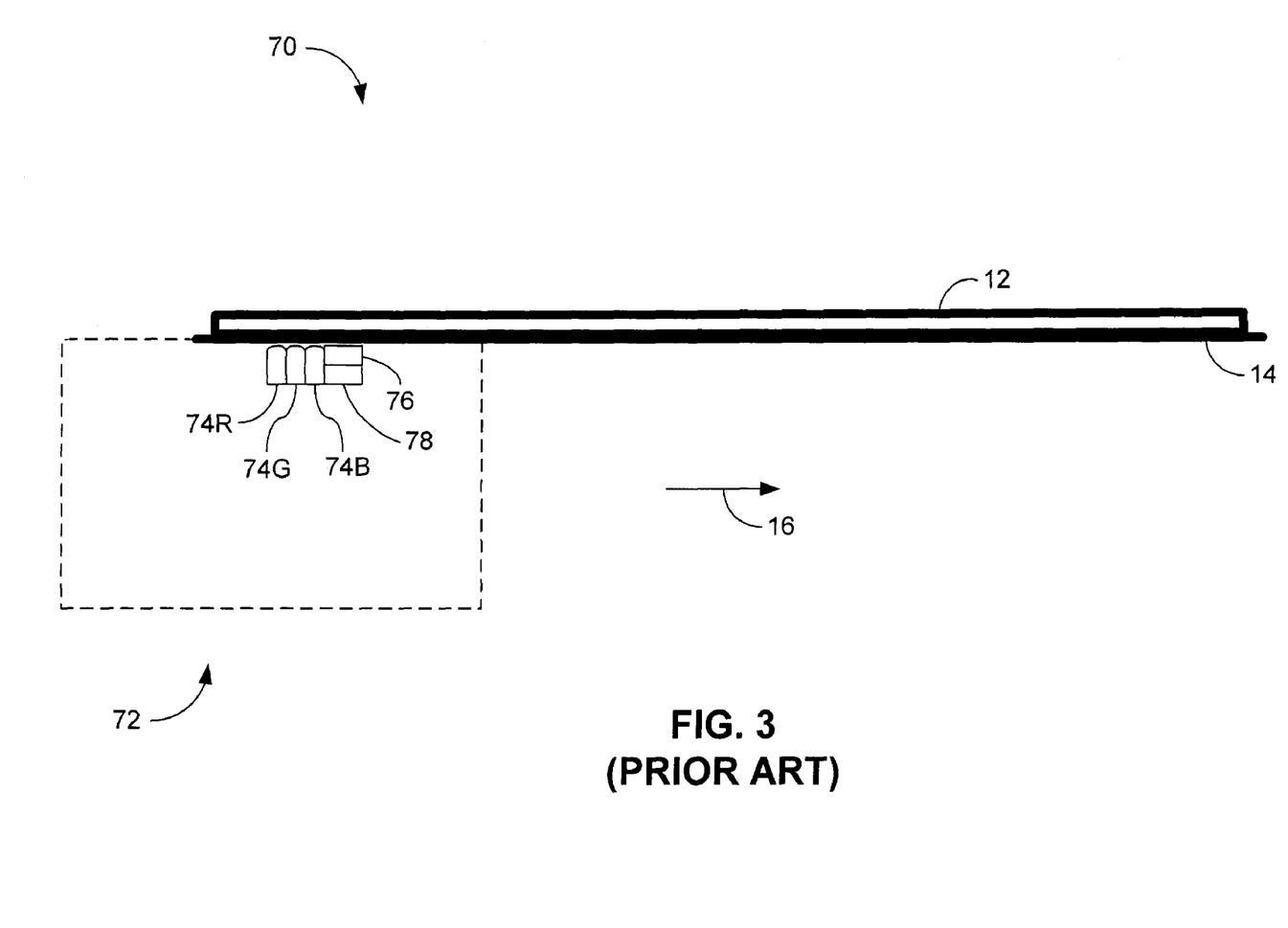
FIG. 3 illustrates certain components of a conventional scanner having a contact-image sensor scan head.

FIG. 3 illustrates certain components of a conventional scanner 70 that is similar to the scanner 10 except it includes a contact-image sensor (CIS) scan head 72. The CIS scan head 72 differs from the scan head 20 of FIG. 1 in that the CIS scan head is much more compact and, therefore allows the scanner 70 to be smaller than scanner 10. The scan head 72 is more compact because it does not require the optical path 23, the mirrors 24, or focusing provided by the lens 26 of FIG. 1. The scan head 72 has the width of the maximum source image 12, and is placed in close proximity with the glass platen 14. For example, to copy or scan an 8½-by 11 sheet of paper, the copier or scanner would include a scan head 72 that is 8½ inches wide.

The scan head 72 is in close proximity to the glass platen 14, and typically uses an array 74 of red, green, and blue light sources across the scan head 72 to provide a full spectrum of light to illuminate the source image 12. The light source typically include light emitting diodes (LED). There are two main types of illumination based on LEDs. One style includes LEDs placed across the whole width of the scan head 72, and another style includes a few (even a single per color) LEDs on the side of the scan head and a plastic wave guide or light pipe is used to distribute the light across the width of the scan head. A lens 76 is positioned between the light reflected from the source image 12 and the CCD sensor 78. A single row of sensors comprise the CCD sensor 78. The single row of sensors is distributed across the scan head 72 to receive light reflected from the source image 12 after being focused by the lens 76. In an 8.5-inch wide 600 dpi sensor, there are 5100 sensors in the single row. While the scan head 20 of FIGS. 1 and 2 uses a single white light source 22 and three different CCD sensors 28R, 28G, and 28B on a small chip to capture the color components of the source image 12, the CIS scan head 70 uses three different colored light-source arrays 74R, 74G, and 74B, and a single CCD sensor 78 both distributed across a width of the scanned source image 12 to capture all three color components.

To scan the source image 12, for example, first the red-light source(s) 74R are flashed across the width of the source image 12 to illuminate a line of the source image and provide the red components of the image. Then, the green-light source(s) 74G are flashed to provide the green components, and then blue-light source(s) 74B are flashed to provide the blue components. During each light flash, light reflected from the source image 12 is focused by the lens 76 onto the CCD sensor 78, which captures the color component of the image and outputs a representation analog signal. Each color light source 74 is sequentially flashed once for each line and the CCD sensor 78 serially generates the analog color signals in the sequence that the lights are flashed, in this example red, green, and blue. This cycle continues such that the red, green, and blue components of each line of the source image 12 are scanned. Although the scan head 72, with its light array 74 and CCD sensor 78, may move step-by-step so as to scan one line three times, once each for the RGB color components, it is more common for the scan head 72 to move at a constant velocity such that the red, green, and blue components are each scanned for one of three overlapping lines. Since the constant velocity allows every 3rd scan to be a new line (every 3rd scan is the same color), the scanner has only moved or stepped ⅓ of an overlapping line for each color scan. Therefore, the three scanned colors are overlapping. For each line sampled by the CCD scanner 10 of FIG. 1, the CIS scanner 70 of FIG. 3 will scan three overlapping lines. With an equal number of sensors in each row, the resolution of the CCD and CIS type scanners is the same.

The analog signal produced by the CCD sensor 78 of the CIS scanner 70 as it scans RGB color components serially is referred to herein as a serial analog-color signal. The serial analog-color signal contrasts with the three channel analog signal provided by the three rows of sensors of the CCD 28 of the scanner 10 of FIG. 1, which generates the three-color components in parallel on three parallel conductors. Commonly available analog front end/digitizers, such as the AFE 42 illustrated in FIG. 2, do not readily provide a circuit or method for individually processing each color component of a serial-analog signal generated by a CIS scan head 72 to adjust offset and gain. One proposed compromise solution is to couple the CCD sensor 78 to one channel of a commonly available AFE, such as to the red channel at connection 51R of the AFE 42 of FIG. 2, and establish a single-offset value and a single-gain value. The single values would be applied to all three colors. The proposed solution is not adequate because the single values do not take into account a potential for significant variation in the red, green, and blue color-component signals generated by the CCD sensor 78.

SUMMARY

In view of the foregoing, there is a need for a new and improved apparatus and method for individually processing each color component of an analog signal where the signal may have a parallel mode or a serial mode. The present invention is directed to a device, system, and method that provide such an improved apparatus and method for individually processing each color component of a serial-analog signal.

One embodiment of the invention provides a device for individually processing each color component of a serial-analog signal from a color scanner. The device includes a multiple-channel image-capture circuit comprising an analog front end/digitizer having a plurality of channels operable to process an analog-color signal with one channel for each color component of the analog-color signal, a register, and an analog-to-digital converter operable to output a digital signal responsive to the analog-color signal, and a controller operable to control the color-component processing by the plurality of input channels such that each color component of a serial analog-color signal is individually processed. Each input channel of the analog front end/digitizer may include a programmable circuit operable to modify a color component of the color signal in response to a value stored in the register related to the color component.

Such a device allows a serial analog-color signal from a scanner with a contact-image sensor to be individually processed for each color component.

These and various other features as well as advantages of the present invention will be apparent from a reading of the following detailed description and a review of the associated drawings.

BRIEF DESCRIPTION OF THE DRAWINGS

Features of the present invention which are believed to be novel are set forth with particularity in the appended claims. The invention, together with further objects and advantages thereof, may best be understood by making reference to the following description taken in conjunction with the accompanying drawings, in the several figures of which like referenced numerals identify like elements, and wherein:

DETAILED DESCRIPTION

In the following detailed description of exemplary embodiments of the invention, reference is made to the accompanying drawings, which form a part hereof. The detailed description and the drawings illustrate specific exemplary embodiments by which the invention may be practiced. These embodiments are described in sufficient detail to enable those skilled in the art to practice the invention. It is understood that other embodiments may be utilized, and other changes may be made, without departing from the spirit or scope of the present invention. The following detailed description is therefore not to be taken in a limiting sense.

Figure 4:
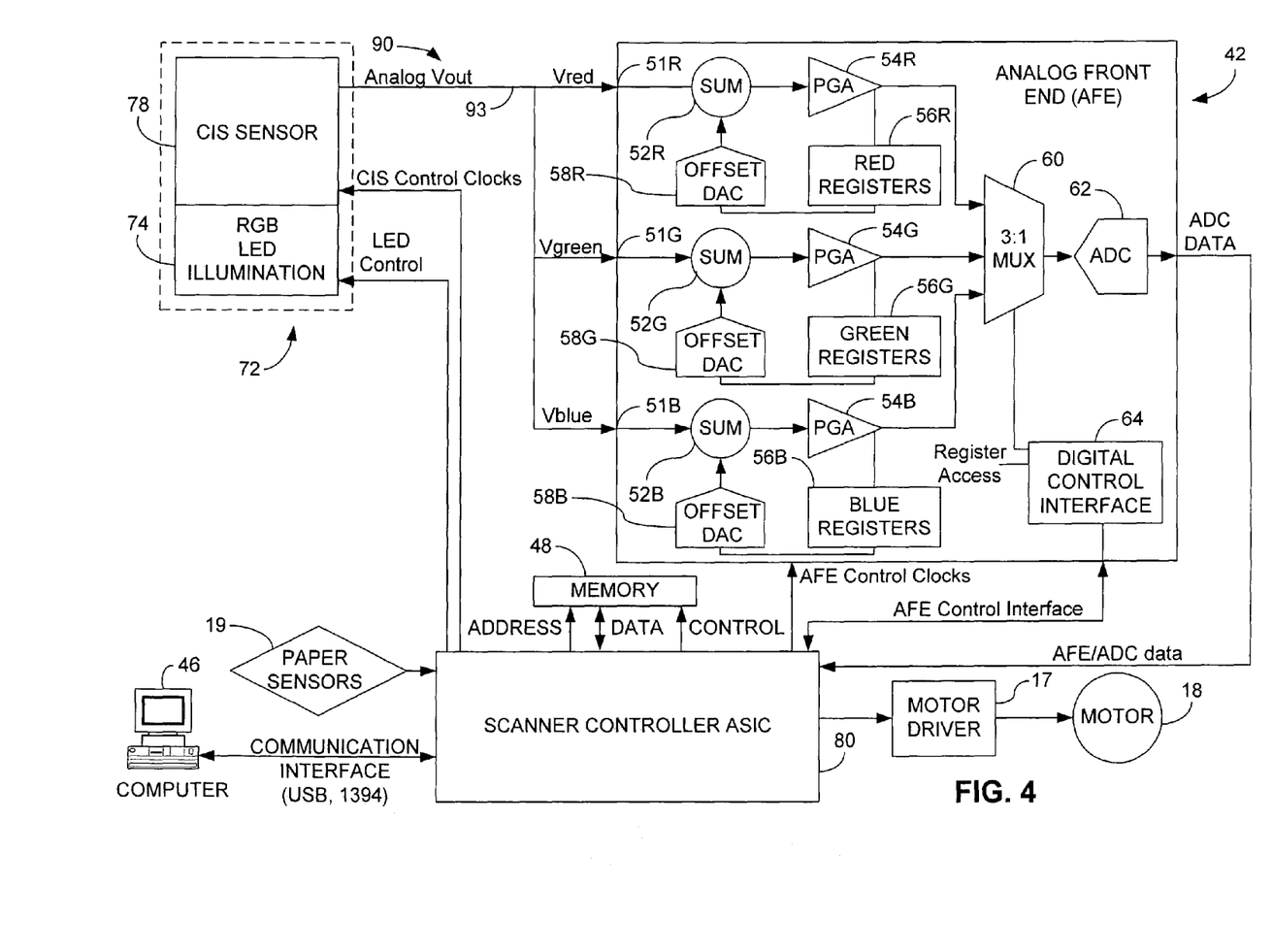
FIG. 4 is a schematic block diagram of a multiple-channel image-processing system for a scanner using a CIS scan head in accordance with an embodiment of the invention.

FIG. 4 is a schematic block diagram of a multiple-channel image-processing system 90 for a scanner using a CIS scan head 72, in accordance with an embodiment of the invention. The system 90 illustrates components of the scanner 70 of FIG. 3, including the CIS scan head 72, and the paper sensors 19, the motor driver 17, and the motor 18 that moves the scan head 72 relative to the source image 12 being scanned. The system 90 also illustrates the analog front end/digitizer 42 (also referred to as "AFE 42"), a scanner controller 80, and the memory 48. Except for the CIS scan head 72 and the scanner controller 80, the components of the system 90 are substantially similar to the system 40 of FIG. 2.

Because the CIS scan head 72 only has one CCD sensor 78, only a single Analog Vout signal is generated. In the embodiment illustrated, a single line 93 carries the serial analog-color signal Analog Vout from the CIS scan head 72 to the AFE 42. The line 93 is connected to the connectors 51R, 51G, and 51B in parallel, providing the signal to the three input channels of the AFE 42. The controller 80 is operable to control the color-component processing by the plurality of input channels such that each color component of the Analog Vout signal is individually processed. The controller 80 is further operable to control the CIS scan head 72 that produces the serial-analog-color signal. Even though the CIS scan head 72 uses the same sensors for each color, the illumination source (LED 74) is not ideal and it is necessary to compensate for each color separately. The overall illumination intensity of each light source in the LED 74 is unique and requires a different gain setting for each illuminant color. In addition, the CCD sensor 78 has some sensitivity to the wavelength of the illumination that must be compensated for. Best results are provided with a unique analog gain and offset for each RGB color.

The functions of the scanner controller 80 may be implemented in hardware such as interconnected machine-logic circuits or circuit modules, firmware, in special purpose digital logic, software, or a combination thereof without deviating from the spirit or scope of the present invention. The implementation is a matter of choice dependent on the performance requirements of the system 90 implementing the invention. Implementation in hardware is a more preferred embodiment.

Operation will be illustrated first by the scanning the red color component. As before, each channel is calibrated for a respective color. The channel coupled to connector 51R is calibrated for red (red channel), the channel coupled to connector 51G is calibrated for green (green channel), and the channel coupled to connector 51B is calibrated for blue (blue channel). The controller 80 flashes the red light source 74R (FIG. 3). The single CCD sensor 78 generates an analog signal that represents only the red illuminated color component of a line of the source image 12. That signal, Analog Vout, is provided to all three channels of the AFE 42 at connectors 51R, 51G, and 51B. Each channel processes the red color component according to values stored in the respective register 58 for the color calibrated for that channel even though the signal Analog Vout includes only the red color component. The controller 80, through the digital interface 64, controls the 3:1 MUX 60 to sample only the processed red color component from the red channel. The other processed signals from the blue and green channels are ignored. The processed and sampled red color analog signal is provided to the ADC 62, which generates the ADC data out signal representing the red color component of one line of the source image 12.

Next, the scan head 72 is advanced one line. The controller 80 flashes the green light source 74G. The CCD sensor 78 outputs a responsive analog signal Analog Vout representing only the green illuminated color component of the source image 12. That signal is provided to all three channels, the green channel coupled to connector 51G being the only channel calibrated for processing green. Each channel processes the green color component according to values stored in the respective register 58 for the color calibrated for that channel even though the signal Analog Vout includes just the green color component. The controller 80, through the digital interface 64, controls the 3:1 MUX 60 to sample only the processed green color component from the green channel. The other processed signals from the red and blue channels are ignored. The processed and sampled green color analog signal is provided to the ADC 62, which generates the ADC data out signal representing the green color component of this line of the source image 12.

The controller 80 performs the same process for the blue color, completing the scanning and digitizing of RGB color data in three lines, one for each RGB color. The resolution of the conventional CCD scanner 10 of FIG. 1 and the CIS scanner 70 of FIGS. 3 and 4 is substantially the same. The CIS scanner 70 scans three overlapping lines for each line the CCD scanner 10 scans, but since the CIS scanner only includes data for one color for each overlapping line and the CCD scanner 10 includes RGB color data for each line, the ultimate resolution is the same.

The ADC data signal still only presents a single pixel at a time as with the CCD scanner 10 of FIG. 1. However, for the CIS scanner 70 of FIG. 3, the ADC data signal serially presents the three colors one line at a time. The ADC data signal (COLORrow-column) from the CIS scanner 70 looks like:

R1-1, R1-2, . . . R1-5100, G1-1, G1-2, . . . G1-5100, B1-1, B1-2, . . . B1-5100

R2-1, R2-2, . . . R2-5100, G2-1, G2-2, . . . G2-5100, B2-1, B2-2, . . . B2-5100

The controller 80 includes a Direct Memory Accesses (DMA) controller (not shown) to which the serialized ADC data signal from the AFE 42 is passed. The DMA controller of the controller 80 unscrambles the AFE data signal and puts it into memory in single color blocks of data. The controller 80 is configured to handle the ADC data signal from either a CIS or CCD type scanner. The data ends up in three separate blocks of memory for each pixel: a block of just the red, a block of green and a block of blue data. The DMA is operable to handle the two different serial streams of data and separate each color and store it in memory appropriately. Firmware in the controller 80 configures the memory block to match type of scanner being controlled.

Still referring to FIG. 4, an alternative embodiment of the system 90 uses only one selected channel of the AFE 42 to process all the color components of the serial analog signal Analog Vout. The values stored in the register 56 of the selected channel are changed to the calibrated value for the color component being processed. For example, the single line 93 carrying the Analog Vout signal from the CIS scan head 72 can be coupled to the connector 51R for processing of all color components by the first channel (shown in FIG. 4 as the channel assigned to processing the red signal). Red is processed by the red channel, sampled by the 3:1 MUX 60, and provided to the ADC 62 as described above, which generates the ADC data out signal representing the red color component of this line of the source image 12. Prior to processing green Analog Vout signal in the red channel, the controller 80, acting through the digital interface 64, changes the calibration values in the first register 56R to the calibration values associated with green. The calibration values may be stored in the register 58, or alternatively, the values may be stored in a memory coupled to the controller 80, such as the memory 48. The controller 80 flashes the green colored light source 74G, and the Analog Vout is provided to the first channel at input 51R, where it is processed according to calibration values then currently stored in the register 54R, which are the calibration values for the green color component. The process is repeated for blue, completing the scanning and digitizing of the serial analog-color signal. The MUX 60 is configured only to sample the signal from the red channel, and does not switch between the channels as in the previously discussed embodiment.

In another embodiment, the controller 80 is operable to control the color component processing for both a serial analog-color signal and a parallel analog-color signal. This embodiment will allow a single AFE 42 and controller 80 pair to process a scan head analog-color-signal output without regard to whether the signal is serialized or parallel. In a further embodiment, the system 90 includes a switch (not illustrated) operable to switch between a plurality of parallel inputs with each input being coupled to one processing channel, a single serial signal input coupled to all processing channels, and a single serial input coupled to one processing channel. The switch may include any structure, such as mechanical or transistor device, or may simply provide alternative positions for hardwiring.

Although the present invention has been described in considerable detail with reference to certain preferred embodiments, other embodiments are possible. Therefore, the spirit or scope of the appended claims should not be limited to the description of the embodiments contained herein. It is intended that the invention resides in the claims hereinafter appended.

What is claimed is:

1. An image-capture circuit, comprising:
a digitizer operable to receive a serial analog color signal having a predetermined sequence of color components wherein each color component represents a row of pixels of a single color, the digitizer having:
a plurality of channels each operable to receive the serial analog color signal and to process a respective color component; and
an analog-to-digital converter operable to sequentially receive and digitize the color components; and
a controller coupled to the digitizer and operable to couple each of the channels to the analog to digital converter in the predetermined sequence.

2. The image-capture circuit of claim 1, wherein the digitizer further includes a multiplexer disposed between the channels and the analog-to-digital converter, and the controller is further operable to cause the multiplexer to couple the channels to the analog-to-digital converter in the predetermined sequence.

3. The image-capture circuit of claim 1, wherein each input channel is operable to modify the respective color component that it processes.

4. The image-capture circuit of clam 3, wherein each input channel is further operable to amplify the respective color component.

5. The image-capture circuit of claim 3, wherein each input channel is further operable to offset the respective color component.

6. The image-capture circuit of claim 1, wherein the controller is further operable to control the digitizer such that the first input channel processes a first color component of the received analog-color signal, the second input channel processes a second color component of the received analog-color signal, and continuing until each color component is individually processed.

7. The image-capture circuit of claim 1, wherein the digitizer is operable to receive the serial analog color signal in the plurality of channels.

8. The image-capture circuit of claim 1, wherein the digitizer is further operable to receive a parallel analog-color signal having color components, each channel of the digitizer being operable to receive a respective color component.

9. The image-capture circuit of claim 1, wherein the controller and the digitizer are formed on a single chip.

10. An image-capture circuit, comprising:
a digitizer operable to receive a serial analog color signal having a predetermined sequence of color components, the digitizer having:
a plurality of signal modification channels, one of the channels operable to sequentially modify each of the color components according to a corresponding modification parameter; and
an analog-to-digital converter operable to sequentially receive and digitize the modified color components from the one of the channels; and
a controller coupled to the digitizer and operable to sequentially update the modification parameter to correspond to the color component that the channel is modifying.

11. The image-capture circuit of claim 10, wherein the modification parameter includes an amplification.

12. The image-capture circuit of claim 10, wherein the modification parameter includes an offset.

13. A scanner, comprising:
a sensor head operable to generate a serial analog-color signal having a predetermined sequence of color components responsive to a scan of an image, each color component representing a row of pixels of a single color; and
an image-capture circuit, including:
a digitizer operable to receive the serial analog color signal and having:
a plurality of channels each operable to receive the serial analog color signal and to process a respective color component;
an analog-to-digital converter operable to sequentially receive and digitize the color components; and
a controller coupled to the digitizer and operable to couple each of the channels to the analog to digital converter in the predetermined sequence.

14. The scanner of claim 13, wherein each input channel is coupled to the serial analog-color signal.

15. The scanner of claim 13, wherein the controller is further operable to synchronize generation of a first color component by the sensor head with the processing of the first color component by a first channel, generation of a second color component by the sensor head with the processing of the second color by a second channel, and continuing until each color component has been generated and processed by a different channel.

16. The scanner of claim 13, wherein the color components include red, green, and blue.

17. The scanner of claim 13, wherein the scan head is a CIS type.

18. A scanner comprising:
a sensor head operable to generate a serial analog-color signal having a predetermined sequence of color components responsive to a scan of an image; and
an image-capture circuit, including:
a digitizer operable to receive the serial analog color signal and having:
a plurality of signal modification channels, one of the channels operable to sequentially modify each of the color components according to a corresponding modification parameter;
an analog-to-digital converter operable to sequentially receive and digitize
the modified color components from the one of the channels; and
a controller coupled to the digitizer and operable to sequentially update the modification parameter to correspond to the color component that the channel is modifying.

19. A method for digitizing a serial analog-color signal having a predetermined sequence of color components wherein each color component represents a row of pixels of a single color, the method comprising:
receiving the serial analog color signal on a single input node;
modifying a first one of the color components with a first channel coupled to the input node and digitizing the modified color component during a first time period; and
modifying a second one of the color components with a second channel coupled to the input node and digitizing the modified color component during a second time period that is separate from the first time period.

20. A method for digitizing a serial analog-color signal having a predetermined sequence of color components, the method comprising:
setting a modification parameter of a selected one of a plurality of channels to a first predetermined level, modifying a first one of the color components with the channel, and digitizing the modified first component during a first time period; and
setting the modification parameter of the channel to a second predetermined level, modifying a second one of the color components with the channel, and digitizing the modified second component during a second time period that is separate from the first time period.

21. An image-capture circuit, comprising:
a plurality of channels each operable to receive a serial analog color signal including a predetermined sequence of color components and to process a respective one of the color components, each color component representing a row of pixels of a single color;
an analog-to-digital converter operable to sequentially receive and digitize the processed color components from the channels; and
a controller operable to couple the channels to the analog-to-digital converter in the predetermined sequence.

22. A scanner, comprising:
a sensor head operable to scan an image and to generate a serial analog color signal that represents the image, the signal having a predetermined sequence of color components wherein each color component represents a row of pixels of a single color;
a plurality of channels each operable to receive the serial analog color signal from the sensor head and to process a respective one of the color components;
an analog-to-digital converter operable to sequentially receive and digitize the processed color components from the channels; and
a controller operable to couple the channels to the analog-to-digital converter in the predetermined sequence.

23. A method for digitizing a serial analog color signal having a predetermined sequence of color components wherein each color component represents a row of pixels of a single color, the method comprising:
receiving the serial analog color signal on each of a first and a second channel;
modifying a first one of the color components with the first channel and digitizing the modified first component during a first time period; and modifying a second one of the color components with the second channel and digitizing the modified second component during a second time period that is separate from the first time period.

24. The method of claim 23, further comprising:
receiving the serial analog color signal on a third channel; and
modifying a third one of the color components with the third channel and digitizing the modified third component during a third time period that is separate from the first and second time periods.

* * * * *